United States Patent [19]

Hall et al.

[11] Patent Number: 4,959,238
[45] Date of Patent: Sep. 25, 1990

[54] PROCESS FOR THE PRODUCTION OF TEXTURIZED ANIMAL PROTEIN

[75] Inventors: Simon R. Hall, Melton Mowbray; Garry D. Wills, Denton, both of England

[73] Assignee: Mars GB Ltd., England

[21] Appl. No.: 249,590

[22] Filed: Sep. 26, 1988

[30] Foreign Application Priority Data

Sep. 29, 1987 [GB] United Kingdom ............... 8722836

[51] Int. Cl.$^5$ .................... A23J 3/26; A23L 1/31
[52] U.S. Cl. ................... 426/447; 426/513; 426/517; 426/524; 426/657; 426/802; 426/805
[58] Field of Search ............. 426/657, 447, 448, 513, 426/517, 574, 802, 805

[56] References Cited

U.S. PATENT DOCUMENTS

| | | | |
|---|---|---|---|
| 3,480,442 | 11/1969 | Atkinson | 426/448 |
| 3,852,492 | 12/1974 | Brown, Jr. et al. | 426/364 |
| 3,917,876 | 11/1975 | Harwood et al. | 426/657 |
| 3,965,268 | 7/1976 | Stocker et al. | 426/331 |
| 3,968,269 | 7/1976 | Payne et al. | 426/629 |
| 4,031,267 | 6/1977 | Berry et al. | 426/656 |
| 4,251,567 | 2/1981 | Ohyabu et al. | 426/580 |
| 4,310,558 | 1/1982 | Nahm, Jr. | 426/98 |
| 4,332,823 | 6/1982 | Buemi | 426/272 |
| 4,338,340 | 7/1982 | Morimoto et al. | 426/104 |
| 4,418,086 | 11/1983 | Marino et al. | 426/302 |

*Primary Examiner*—Donald E. Czaja
*Assistant Examiner*—Evan Federman
*Attorney, Agent, or Firm*—Curtis, Morris & Safford

[57] ABSTRACT

Textured animal protein can be prepared by forming a heated pressurized wet mass of animal meal and extruding the mass or otherwise reducing the pressure and temperature surrounding the mass. The ingredients for the animal meal are chosen so that the measurable gelatin content of the extruded product is less than 10% of the dry solids of the product. As gelatin is a hydrolysis product of collagen, this means that the animal meal should be prepared from material which is intrinsically low in hydrolysable collagen, or the hydrolysable collagen content should be reduced either by cross-linking (for example with propylene glycol alginate) or by hydrolysis and washing away the gelatin.

8 Claims, No Drawings

PROCESS FOR THE PRODUCTION OF TEXTURIZED ANIMAL PROTEIN

This to textured animal protein and to a process for the production of a textured animal protein.

Textured animal protein is protein of a fibrous nature simulating the striated muscle of animals being derived in part or wholly from an animal source. The term animal includes all species of the kingdom Animalia, particularly members of the subphylum vertebrata including fish and members of the class mammalia. This invention is related particularly but not exclusively to the reforming of unstriated meat and offal materials to form textured animal protein.

Muscle meats can be considered to be comprised of a system of fibres bound together. The food industry has developed a number of techniques for the simulation of this texture. To date, one of the most convincing, cost effective and commercially successful of these is the process of continuous cooker extrusion under expansion conditions for the texturisation of vegetable protein, such as soya. The proteinaceous material is subject to elevated temperature and pressure and forced through a die in a continuous fashion. The high temperatures and pressures transform the proteinaceous mass into a plastic mass under high pressure. Under transfer, through the die, into atmospheric pressure, the plastic mass expands as the superheated moisture "flashes off". The expansion occurs at right angles to the direction of flow, producing the appearance of fibres. This process is disclosed in U.S. Pat. No. 3,480,442.

In the preparation of food and food products, meat meal and meat and bone meals have generally been left as waste products after treating ex-abbatoir animal carcases to remove the fats. These fats have then generally been sold as tallow. The meals are protein rich, and so their current disposal is wasteful of a potentially useful source of protein.

U.S. Pat. No. 3,968,269 discloses the production of a protein food product said to have a porous expanded structure with the texture and organoleptic properties of meat, by a process which comprises forming a mixture of a vegetable protein containing material and a meat source in an amount of between about 5 to 80% by weight, the mixture having a protein content on a dry basis of at least about 25% by weight, followed by extrusion of the mixture.

In the development of the manufacture of meat analogues and reformed meat products, to date the use of meat based materials such as meat meal and meat and bone meal in the cooker extrusion process has been successful in the absence of vegetable proteins, largely only insofar as producing a glassy unstructured product.

U.S. Pat. No. 2,830,902 discloses a process for the production of a food product comprising a protein system in the form of a chewy protein gel, which process comprises (a) adjusting the composition of a protein-water system, in particular the pH and the solids content, to a composition conducive to gel formation, (b) the shaping of the system, and (c) the application to the adjusted system of such heat as is necessary to produce a chewy gel.

U.S. Pat. No. 3,852,492 discloses a process of producing a high protein food product from oilseed meal, fish meal, meat meal, poultry by-product meal, and microbial protein by mixing into the proteinaceous material having a controlled moisture content, a reagent of edible water soluble ammonium or substituted ammonium compound, and extruding such water soluble compound under elevated temperature and pressure conditions to cause physical and chemical changes, and discharging such into a zone of substantially lower pressure.

The production of an expanded textured product, suitable for use as a meat replacement, has, to date, been associated with significant problems using starting materials derived solely from animals. The product in this case is often granular, glassy and untextured even when extruded under expansion conditions (i.e. temperatures greater than 100° C. and pressure greater than 1 atmosphere).

It has now been found that problems associated with the extrusion product may be overcome or alleviated if the measurable gelatin content (as determined by the method herein described) of the product is within certain limits. It was proposed by the present inventors and subsequently demonstrated that the presence of gelatin, which may be produced from collagen during heat treatment, may be the most significant antagonistic factor to the extrusion product having satisfactory textured properties. It appears, although the applicants do not wish to be bound by this theory, that the presence of excess gelatin in the extrudate bestows on the extrudate product a low setting point and consequently while expansion does, in fact, occur as the extrudate leaves the extruder die, under conditions of high pressure and temperature, the cooling that coincides with the "flashing off" of the steam is insufficient to set the structure before it collapses upon equilibration of the pressure within and without the extrudate.

According to one aspect of the present invention there is provided an expanded textured animal protein product the measurable gelatin content of which is less than 10% of the dry solids of the product.

According to a second aspect of the present invention there is provided a process for the production of textured animal protein product, comprising forming a heated pressurised wet mass of animal meal and reducing the pressure and temperature surrounding the mass, the textured animal protein product having a measurable gelatin content of less than 10% of the dry solids of the product.

It will be appreciated that the animal meal can be so selected or treated that the product has the requisite low gelatin content. As will be appreciated from this specification, the selection or choice of treatment can be made on the basis of simple tests, without the need for undue experimentation.

Preferably the measurable gelatin content is less than 7%, and more preferably less than 5%, by weight of final dry solids of the product. More preferably the measurable gelatin content is undetectable or less than 2% of the final dry weight of the product.

It is preferred that the protein of the product be comprised wholly of animal derived protein, i.e. in the absence of functional vegetable proteins such as soya or farinaceous protein, so that the product has an amino acid profile more suited for animal consumption. However, certain amounts of vegetable protein may be tolerated; for example up to 50% of the total amount of protein may be vegetable protein, although it is preferred to have the proportion of vegetable protein below 40, 30, 20 or even 10%.

The most preferred extruded textured animal protein comprises more than 95% or approximately 100% animal solids based on the total dry solids. It should be noted that: "dry solids" refers to solids which have been oven dried, and does not necessarily imply that the solids are anhydrous; the term "vegetable" includes all species not of the kingdom Animalia: and the term "protein" includes gelatin, and also includes polypeptides.

The extruded textured animal protein product may contain solids other than protein. Typically the product will contain an aid to extrusion and/or a plasticiser, for example ammonium sulphate. Normally the content of ammonium sulphate or other extrusion aid/plasticiser is less than 2% by weight of the final dry solids of the product. The product may alternatively or in addition contain alginates such as propylene glycol alginate, typically being present in an amount of up to 2%.

Other typical solids contained in the product include natural colourings and/or dyestuffs, typically in an amount of up to 1%, more preferably less than 0.5%. Minerals, particularly calcium and phosphorous may also be present, as may vitamins and other nutritional requirements of mammals or other animals for which the products of the invention are suitable foodstuffs.

The product may include bone meal. However, untreated bone meal may contain an unacceptably high proportion of collagen (which yields gelatin on hydrolysis). If present, the bone meal may be pre-treated to cross-link collagen to reduce the measurable gelatin content of the product.

The ash residues of the product may be less than 25% by weight of the dry solids of the product.

Preferably the fat content of the animal meal when dried is less than 10% or 5% fat (by weight), especially 2% so that the heated mass is properly workable and the product contains an appropriate amount of protein. The water content of the wet animal meal is preferred to be from 10% to 60%, for example 25% to 50% water, by weight, again for reasons of workability and so that the mass has a sufficient water content to flash off when the pressure is reduced.

Preferably, a reagent of edible water-soluble ammonium or substituted ammonium compound is added to the animal meal.

Preferably the means of reducing the pressure is by extrusion of the mass from a superatmospheric pressurised region into the atmosphere through an extrusion die, which may be in the form of a fine orifice (for example from 1 to 20 mm diameter), or from any other relatively high pressure region to a relatively low pressure region.

In an extrusion process, a heated pressurised wet mass of animal meal is typically blended to a dough and compressed in a chamber of a cooker extruder which is heated to temperatures in excess of 100° C.; the animal meal dough can be worked by an auger or screw through a barrel of the cooker and extruded into the atmosphere through a fine orifice, typically a 5 to 20 mm die, for example a 6 mm die, forming a texturised extrudate the gelatin content of which is less than 10%.

However, other ways of reducing the pressure include simply causing a rapid reduction in local pressure and temperature for example by use of a puffer gun. The reduction in the pressure may typically be less than 1,000 psi (6.9 MNm$^{-2}$), typically 150–200 psi (1–1.4 MNm$^{-2}$). The final ambient pressure will usually (but not necessarily) be atmospheric. The reduction in the temperature may be in the order of 20° C. to 150° C., for example 50° to 75° C. This may be a drop from a temperature in excess of 100° C.; for example 120° C. Again the final ambient temperature may (but need not) be room temperature (20° or 25° C.)

The animal meal used may for example be fish meal, "meat" meal or poultry by-product meal. By "meat" meal is meant meal prepared from such ex-abbattoir meats and products as beef, pork, lamb, mutton and rabbit, including game. Poultry includes chicken, turkey and duck. The preferred animal meals for the process for the production of extruded textured animal protein according to the present invention are derived from unstriated meats and/or offal materials which have an intrinsically low hydrolysable collagen content (and which would therefore lead to a low amount of measurable gelatin). Examples of suitable animal meals are of spleen, intestine and heart.

It should be noted that it is not essential only to use low collagen materials as raw materials. Where the raw materials from which the animal meal is derived for use in a process according to the present invention have a high collagen content and would otherwise lead to an extrusion product containing more than 10% of measurable gelatin, several means may be employed to ensure that the amount of measurable gelatin of the product is less than 10%, for example by treatment of the animal meal of the starting material. The amount of hydrolysable collagen in the animal meal may be reduced by reacting (eg by heating) the meal with a collagen cross-linking agent. Preferred collagen crosslinking agents are dialdehydes such as glutaraldehyde and dialdehyde starch, di- and polycarboxylic acids and their active derivaties (such as succinoyl dichloride) and propylene glycol alginate. Preferably the collagen crosslinking agent(s) is/are present in the animal meal at a level equal to or greater than 8% by weight of the original collagen content of the animal meal.

Alternatively or additionally the amount of collagen in the raw materials which would lead to measurable gelatin in the extrudate being in excess of 10% may be reduced by effecting the prior conversion of collagen of animal meal to gelatin and/or non-gelatin polypeptides and washing these from the animal meal (that is to say prior to forming a heated pressurised mass of the residual proteinaceous function and passing the heated pressurised mass into an area of reduced pressure). Suitable means of effecting the conversion of collagen to gelatin and washing gelatin from the animal meal include blanching in boiling water resulting in the leaching and subsequent washing away of the gelatin. It can be seen that one way of reducing the amount of collagen would be to render the animal meal or material from which the animal meal is prepared under suitable conditions to convert the collagen to gelatin, which can then be washed out.

Extruded textured animal protein product according to the present invention may be formed using the process of cooker-extruding the materials under controlled conditions of moisture, temperature and pressure. The products bear a considerable resemblance to meat, being expanded, chewy, resilient and stable to water and heat with a fibrous, meat-like texture. The texture is generally similar to that of textured vegetable protein as prepared by the cooker extrusion of soya grits and other proteinaceous vegetable materials, and is plexilamellar in nature.

Unstriated meat or offal material may be rendered prior to extrusion by cooking, and a protein-rich fraction, which has a low fat content less than 4% fat, and a moisture content of less than 60% (for example from 25% to 50%) formed and a heated pressurised wet mass of animal meal formed from the protein rich fraction. The cooking parameters usually employed for rendering are cooking for 1-2 hours at a temperature of 60° to 100° C. and in a pH range of 5 to 8.

It has now also been found that, even for what appears to be unsuitable raw materials, the proportion of resulting gelatin in the textured animal protein can be kept below 10% if the conditions under which a prior rendering operation is carried out are controlled within certain parameters. Thus, rendering may be carried out at a temperature of less than 70° C., preferably in a temperature range of from 40° to 60° C., under alkaline or acid conditions, preferably from pH 3 to pH4.5 or from pH8 to pH10.5.

Product produced by this invention may be used in human or animal foodstuffs, particularly in petfoods, for example for cats and/or dogs.

The "measurable gelatin content" of textured animal protein product in accordance with the invention can be determined as follows.

10 g of product are weighed out onto a 250 ml beaker. 125 ml water are added and the contents of the beaker are brought to the boil with constant stirring. 0.5 ml glacial acetic acid is added. The mixture is then digested on a steam bath for 15 to 30 minutes and filtered through a No. 4 WHATMAN filter paper into a 250 ml volumetric flask, and the filtrand washed with hot water. (The word WHATMAN is a trade mark.) The filtrate is cooled and made up to 250 ml with water. 25 ml of the diluted filtrate is pipetted into a porcelain dish and 0.25 ml formalin added, and mixed thoroughly with a glass rod. This mixture is concentrated to a thick consistency, and a further 0.25 ml formalin added, with thorough mixing. The mixture is spread evenly over the base to within 2.5 cm of the rim, and baked hard on a boiling steam bath for 2 hours.

The contents of the dish are extracted twice with 100 ml of diluted formalin (2.5 ml formalin diluted to 100 ml with water) at 40° C., and maintained at 40° C. throughout each extraction, each of which takes approximately 1 hour. Each washing is filtered through a No. 54 WHATMAN filter paper. During the final extraction, the complex is broken up. The complex is loosened and transferred to the filter paper, and washed with a further 100 ml of the dilute formalin solution at 40° C.. The nitrogen content in the gelatin-formaldehyde complex is determined by Kjeldahl method as follows.

A portion of the gelatin-formaldehyde complex sample expected to contain about 0.03 to 0.04 g N is weighed out and transferred to a Kjeldahl digestion flask. 0.7 g mercuric oxide, 15 g powdered potassium sulphate and 40 ml concentrated sulphuric acid are added. The flask is heated gently in an inclined position until frothing ceased, and the contents are then boiled briskly for 2 hours. The flask and contents are allowed to cool. Approximately 200 ml of water and 25 ml sodium thiosulphate solution (80 g/l) are added and mixed. A piece of granulated zinc is added, and sufficient sodium hydroxide solution (450 g/l) is poured carefully down the side of the flask to make the contents strongly alkaline (about 110 ml). Before mixing the acid and alkaline layers, the flask was connected to a distillation apparatus incorporating an efficient splash head and condenser. To the condenser a delivery tube which dips just below the surface of a pipetted volume of standard acid contained in a conical flask received is fitted. The contents of the digestion flask are mixed, and then boiled until at least 150 ml distil into the receiver. 5 drops of methyl red indicator solution (0.5 g/200 ml ethanol) are added, and a filtration is performed with 0.1 m sodium hydroxide. A blank filtration is carried out. Since 1 ml of 0.1M hydrochloric acid or 0.05M sulphuric acid is equivalent to 0.0014 g N, and the gelatin content is 5.55 times the N content, the measurable gelatin content of the product is calculated.

Several embodiments of the present invention will now be described by way of example only. All percentages are by weight unless otherwise specified.

EXAMPLE 1

Fresh or frozen pig spleens are a suitable raw material for this example. A homogenate was prepared from pig spleens which was then wet rendered by cooking in a closed vessel at 100° C. for 60 minutes. The cooked solids were then separated from the cooking liquor by decantation and dried at 80° C. for 60 minutes using a fluidised bed dryer. The dried meat meal was hexane extracted to reduce the oil content to a residual level of 4% by weight when the defatted meal was allowed to air dry to remove any residual solvent. The defatted meal was finely ground by passing the material through a 1.5 mm screen in an ultracentrifugal mill.

The moisture content of the defatted ground meat was increased by adding 70 parts of spleen meal to 30 parts by weight of water and blending the mixture for 10 minutes. The total mix was then fed into an extruder having 25:1 length to diameter ratio screw. The extruder barrel had 3 heating zones which were set at 120° C., 180° C. and 130° C. from inlet to die head respectively. The material on passing through the barrel under elevated pressure was discharged through a 6 mm orifice into the atmosphere. Upon discharge, the material underwent partial dehydration, cooling and expansion as moisture flashed off into the atmosphere, resulting in a stable textured rope extrudate, analogous in appearance to striated muscle meat. The product was plasticised and well expanded and found to have a measurable gelatin content of 1.7% by the method described above.

COMPARATIVE EXAMPLE A

Example 1 was repeated except that the starting material was pig spleen meal containing added gelatin, that is 63% spleen meal, 7% gelatin, 30% plasticiser solution. The measured gelatin content of the product was found to be 11.7%. The extrudate was unstable and not textured, and surging took place on extrusion. The plasticiser solution referred to in this example and other examples is an aqueous solution of ammonium sulphate formulated to give a final ammonium sulphate concentration of 2% w/v.

EXAMPLE 2

Example 1 was repeated, except that the starting raw material was mechanically recovered meat derived from 63% spleen meal, 7% bone collagen and 30% plasticiser solution. This resulted in a stable textured rope extrudate, analogous to striated muscle meat. The product was plasticised and well expanded, but slightly less expanded than that of Example 1. The product was found to have a measurable gelatin content of 6.1% by the method described above.

COMPARATIVE EXAMPLE B

Example 2 was repeated except that the starting material contained added gelatin, this is 57% spleen meal, 13% gelatin, 30% plasticiser solution. The measurable gelatin content of the product was found to be 17.8%. A fibrous extruded product was not produced.

EXAMPLE 3

Example 1 was repeated, except that the starting raw material was a mixture of offals containing 45% pig spleen, 43% sheep small intestine and 12% pig bladders This resulted in a stable textured rope extrudate, analogous to striated muscle meat, which was found to have a measurable gelatin content of 7.9%.

COMPARATIVE EXAMPLE C

Example 3 was repeated, except that the starting raw material was a mixture of offals containing 60% pig bladders, 20% small intestine and 10% pig spleen and 10% bone collagen. The product was found to have a measurable gelatin content of 15.1%. An extruded fibrous product was not produced.

EXAMPLE 4

Example 1 was repeated except that the starting material was a mixture of muscle and offal tissues balanced such that the total measurable gelatin content of the extrudate product was approximately 8%. This resulted in a stable textured rope extrudated, analogous to striated muscle meat. Typical mixtures contain mechanically recovered meats such as turkey, pork, pig and sheep diaphragms and bladders.

EXAMPLE 5

Example 1 was repeated except that the starting material was a mixture of smooth muscle materials such as bladders and non-meat proteinaceous material such as defatted soya meal or defatted fish meal; to give an extrudate product with an overall measurable gelatin content of about 8%. This resulted in a stable textured rope extrudate, analogous to striated muscle meat.

EXAMPLE 6

Example 1 was repeated except that the water added to the meal prior to extrusion had 6.5% ammonium hydroxide dissolved therein. This resulted in a stable textured rope extrudate, analogous to striated muscle meat. The use of the ammonium hydroxide gave improved texturisation of the extrudate.

EXAMPLE 7

Example 6 was repeated except that the water used in the mixture had 0.4% ammonium sulphate dissolved therein, in addition to the 6.5% ammonium hydroxide. This further improved texturisation of the extrudate.

EXAMPLE 8

Example 1 was repeated except that starting material was a proteinaceous material. The material which was defatted and dehydrated and mixed with water and 8% by weight of propylene glycol alginate, so as to cross link collagen in the starting material. This example resulted in a stable textured rope extrudate, analogous to striated muscle meat, which was found to contain 8% measurable gelatin.

EXAMPLE 9

A combination of pig spleens and bladders was used to prepare a homogenate by mincing the material through a Weiler grinder using a 10 mm plate. The minced offals were wet rendered, as described in Example 1, by cooking in a closed vessel at 100° C. for 60 minutes. The cooked greaves were separated from the cooking liquor by decantation and blanched in boiling water. After 15 minutes, the blanching liquor was drained off and the defatted, largely gelatin-free meat was dried in a fluid bed dryer at 80° C. for 60 minutes. The remainder of the process was as described in Example 1 from the description of the hexane extraction process onwards. This resulted in a stable textured rope extrudate analogous to striated muscle meat containing 7.4% measurable gelatin.

EXAMPLE 10

A combination of pig spleens and bladders was used to prepare a homogenate as described in Example 9. The minced offals were then gently heated at 50° C. for 15 minutes (instead of at 100° C. for 60 minutes) under atmospheric pressure before drying at 60° C. under vacuum. The remainder of the process was as described in Example 1 from the description of the hexane extraction process onwards. This resulted in a stable textured rope extrudate, analogous to striated muscle meat, each containing less than 10% measurable gelatin.

EXAMPLE 11

Collagenous pork material was worked at 121° C. for 60 minutes and subsequently washed to remove soluble proteins. The resulting material was then processed according to the method of Example 1 from the drying stage. The dry meal led to the formation of a well expanded plasticised product on cooking and extrusion; the product contained 3% measurable gelatin.

COMPARATIVE EXAMPLE D

Collagenous pork material was worked at 95° C. for 60 minutes and subsequently washed and processed as in Example 11. In this instance, more gelatin was present and a well expanded plasticised product could not be formed; the product contained 13% measurable gelatin.

What is claimed is:

1. A process for the production of textured animal protein product comprising reducing the amount of gelatin, hydrolysable collagen or both in animal meal, forming a heated pressurised wet mass of the animal meal, and reducing the pressure and temperature surrounding the mass so that the textured animal protein product has a measurable gelatin content of less than 10% of the dry solids of the product.

2. A process for the production of textured animal protein product comprising reducing the amount of gelatin, hydrolysable collagen or both in the material from which animal meal is prepared, preparing animal meal from said material, forming a heated pressurised wet mass of the animal meal, and reducing the pressure and temperature surrounding the mass so that the textured animal protein product has a measurable gelatin content of less than 10% of the dry solids of the product.

3. A process for the production of textured animal protein product, comprising preparing animal meal from material rendered at a temperature of less than 70° C. under alkaline conditions, forming a heated pressurised wet mass of the animal meal, and reducing the pressure and temperature surrounding the mass so that the textured animal protein product has a measurable gelatin content of less than 10% of the dry solids of the product.

4. A process as claimed in claim 1, wherein the amount of hydrolysable collagen in the animal meal is reduced by reacting the meal with a collagen crosslinking agent.

5. A process as claimed in claim 2, wherein the amount of hydrolysable collagen in the animal mean is reduced by effecting the prior conversion of collagen to gelatin, non-gelatin polypetides or both and washing these from the animal meal.

6. A process as claimed in claim 2, wherein the amount of hydrolysable collagen in the animal meal is reduced by reacting the meal with a collagen crosslinking agent.

7. A process as claimed in claim 1, wherein the amount of hydrolysable collagen in the animal meal is reduced by effecting the prior conversion of collagen to gelatin, non-gelatin polypetides or both and washing these from the animal meal.

8. A process for the production of textured animal protein product, comprising preparing animal meal from material rendered at a temperature of less than 70° C. under acid conditions, forming a heated pressurised wet mass of the animal meal, and reducing the pressure and temperature surrounding the mass so that the textured animal protein product has a measurable gelatin content of less than 10% of the dry sqlids of the product.

* * * * *